United States Patent
He et al.

(10) Patent No.: US 11,977,758 B2
(45) Date of Patent: May 7, 2024

(54) ASSIGNING BLOCKS OF MEMORY SYSTEMS

(71) Applicant: Micron Technology, Inc., Boise, ID (US)

(72) Inventors: Deping He, Boise, ID (US); Caixia Yang, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 33 days.

(21) Appl. No.: 17/887,247

(22) Filed: Aug. 12, 2022

(65) Prior Publication Data

US 2024/0053911 A1 Feb. 15, 2024

(51) Int. Cl.
*G06F 3/06* (2006.01)

(52) U.S. Cl.
CPC ............ *G06F 3/064* (2013.01); *G06F 3/0619* (2013.01); *G06F 3/0667* (2013.01); *G06F 3/0673* (2013.01)

(58) Field of Classification Search
CPC ...... G06F 3/064; G06F 3/0619; G06F 3/0667; G06F 3/0673
See application file for complete search history.

(56) References Cited

U.S. PATENT DOCUMENTS

| | | | |
|---|---|---|---|
| 9,229,854 B1* | 1/2016 | Kuzmin | G06F 3/0679 |
| 2007/0030734 A1* | 2/2007 | Sinclair | G06F 3/0679 |
| | | | 365/185.11 |
| 2019/0205043 A1* | 7/2019 | Huang | G06F 12/1009 |
| 2019/0332331 A1* | 10/2019 | Hsieh | G06F 3/0617 |
| 2020/0042470 A1* | 2/2020 | Lee | G06F 3/0604 |

* cited by examiner

*Primary Examiner* — William E. Baughman
(74) *Attorney, Agent, or Firm* — Holland & Hart LLP

(57) ABSTRACT

Methods, systems, and devices for assigning blocks of memory systems are described. Some memory systems may be configured to initiate an operation to characterize a plurality of blocks of a memory system; identify a first quantity of complete blocks of the plurality of blocks and a second quantity of reduced blocks of the plurality of blocks based at least in part on initiating the operation; determine, for a block of the second quantity of reduced blocks, whether a quantity of planes available for use to store the information in the block satisfies a threshold; and assign the block as a special function block configured to store data associated with a function of the memory system based at least in part on determining that the quantity of planes available for use to store the information in the block of the second quantity of reduced blocks satisfies the threshold.

25 Claims, 8 Drawing Sheets

ASSIGNING BLOCKS OF MEMORY SYSTEMS

FIELD OF TECHNOLOGY

The following relates to one or more systems for memory, including assigning blocks of memory systems.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read (e.g., sense, detect, retrieve, identify, determine, evaluate) the state of one or more memory cells within the memory device. To store information, a component may write (e.g., program, set, assign) one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be described in terms of volatile configurations or non-volatile configurations. Volatile memory cells (e.g., DRAM) may lose their programmed states over time unless they are periodically refreshed by an external power source. Non-volatile memory cells (e.g., NAND) may maintain their programmed states for extended periods of time even in the absence of an external power source.

DETAILED DESCRIPTION

Figure 1:
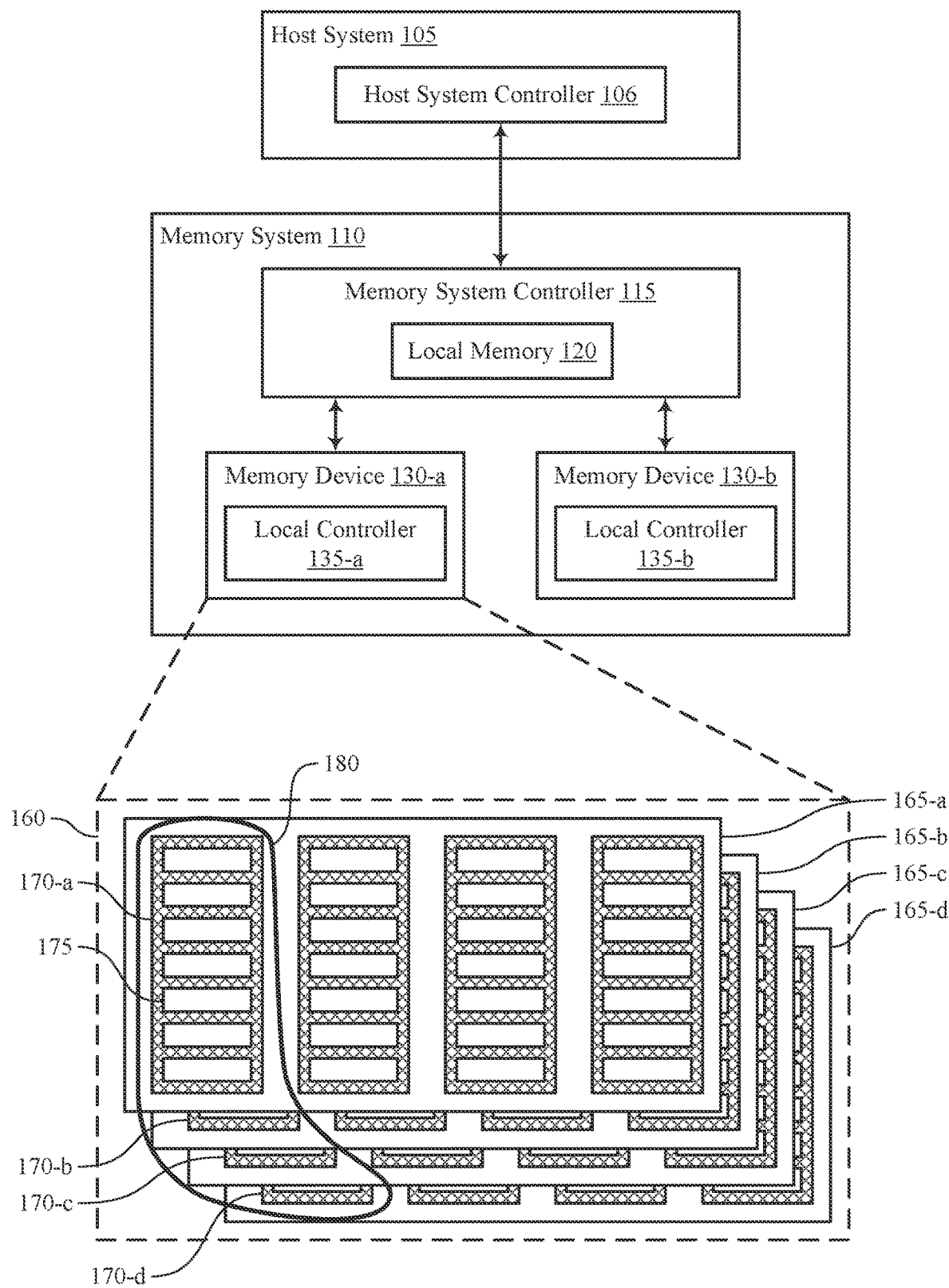
FIG. 1 illustrates an example of a system that supports assigning blocks of memory systems in accordance with examples as disclosed herein.

Systems for memory, including assigning blocks of memory systems, are disclosed. Some NAND memory system may be configured with multiple device dies operating in parallel. The management of the contents of the blocks of the memory system may include use of commands to identify complete blocks, identify bad blocks, and to identify partially good blocks based upon a determination of the quantity of good planes located at a particular block address. The memory systems may also assign a set of virtual memory blocks to perform functions associated with special functions of the memory system. Performance of the memory systems as part of accessing special blocks may not be as critical for system performance as compared to blocks used to store data received from a host system. The blocks related to the special functions may be configured to not use all of the planes. The memory system controller may identify whether each block is a complete block, a reduced or partially good block, and a bad block. The memory system is determined to be a qualified device if the quantity of complete blocks are greater that a minimum quantity of complete blocks. If the functional blocks are stored in the reduced or partially good block, the memory system may dedicate more of its complete blocks to user data. As such, memory systems containing enough complete blocks to store user data but not enough complete blocks to also store the data related to special functions may still be considered a qualified device if the information associated with the special functions can be stored within the reduced or partially good blocks. This process increases the yield of qualified memory systems without significantly impacting system performance.

Yield of qualified memory systems from a manufacturing process may depend upon each system containing more than a minimum quantity of complete blocks that have all planes functional. Fabrication flaws may render a quantity of the blocks to be less than fully functional. The yield of memory systems may be increased if a quantity of partially functional blocks having less than all planes being fully functional are utilized. Currently, systems with less than the minimum quantity of complete blocks required for storing data in the device may be rejected or be classified as a lower grade of device.

Implementations described herein address the aforementioned shortcomings and other shortcomings by providing use of reduced or partially functional blocks for storing data associated with special functions of a memory system. Access performance of a memory system is greater for complete blocks compared to partially functional blocks. With the addition of additional memory planes to blocks of memory systems, a likelihood that some blocks may be reduced, or partially functional blocks may increase because as the quantity of planes-per-block increases it may increase the likelihood that one or more of the planes of the block are not functional. Using complete blocks may be useful for performance of some aspects of a memory system (e.g., storing data received from a host system), not all information stored on the memory system uses the greater access performance that can be achieved with a complete block. For example, some special functions of the memory system may achieve performance thresholds using a block that has reduced functionality. Yield of fabricated memory devices may be increased by use of reduced or partially functional blocks for storing data associated with special functions of the memory system.

Figure 2:
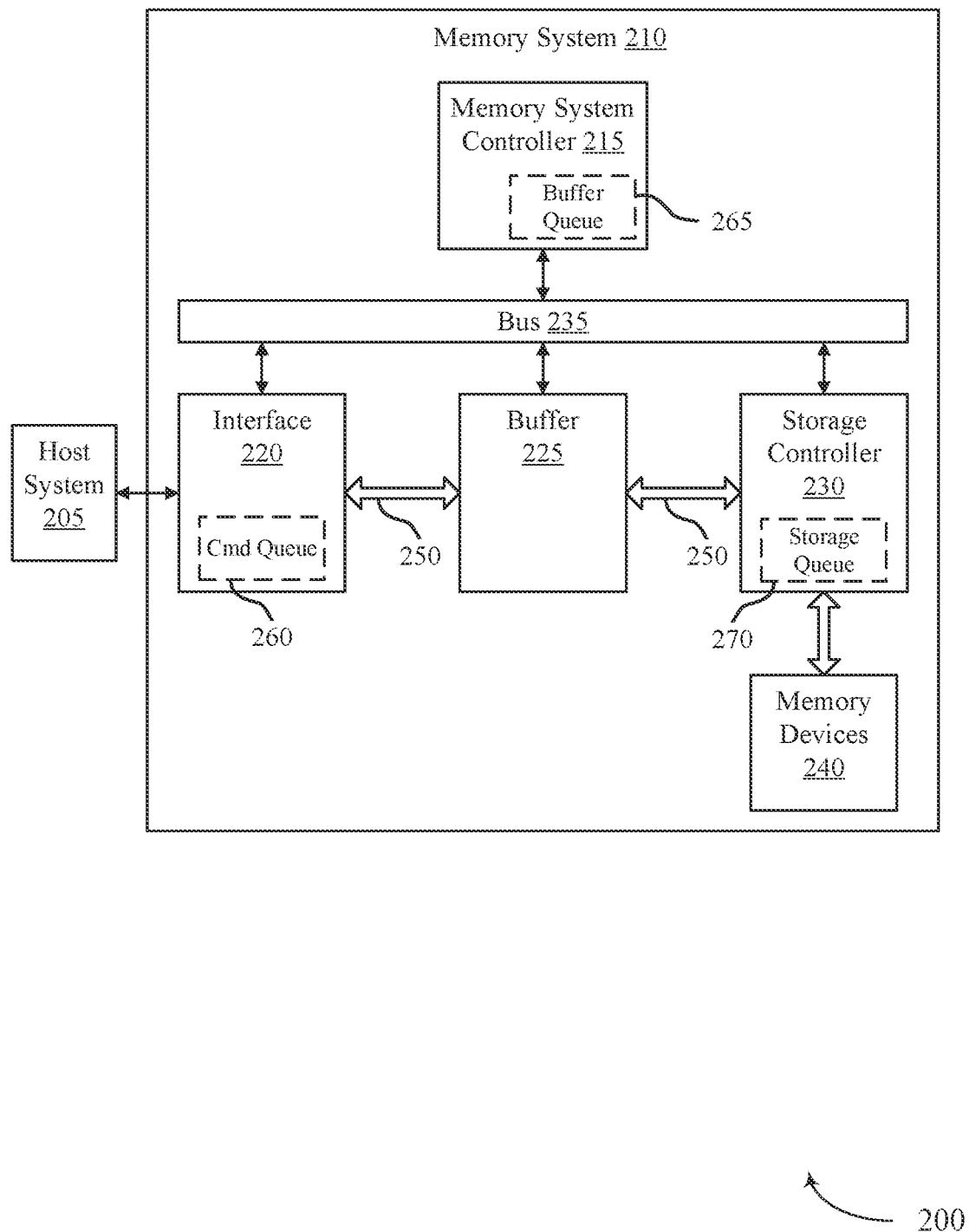
FIG. 2 illustrates an example of a system that supports assigning blocks of memory systems in accordance with examples as disclosed herein.
Figure 8:
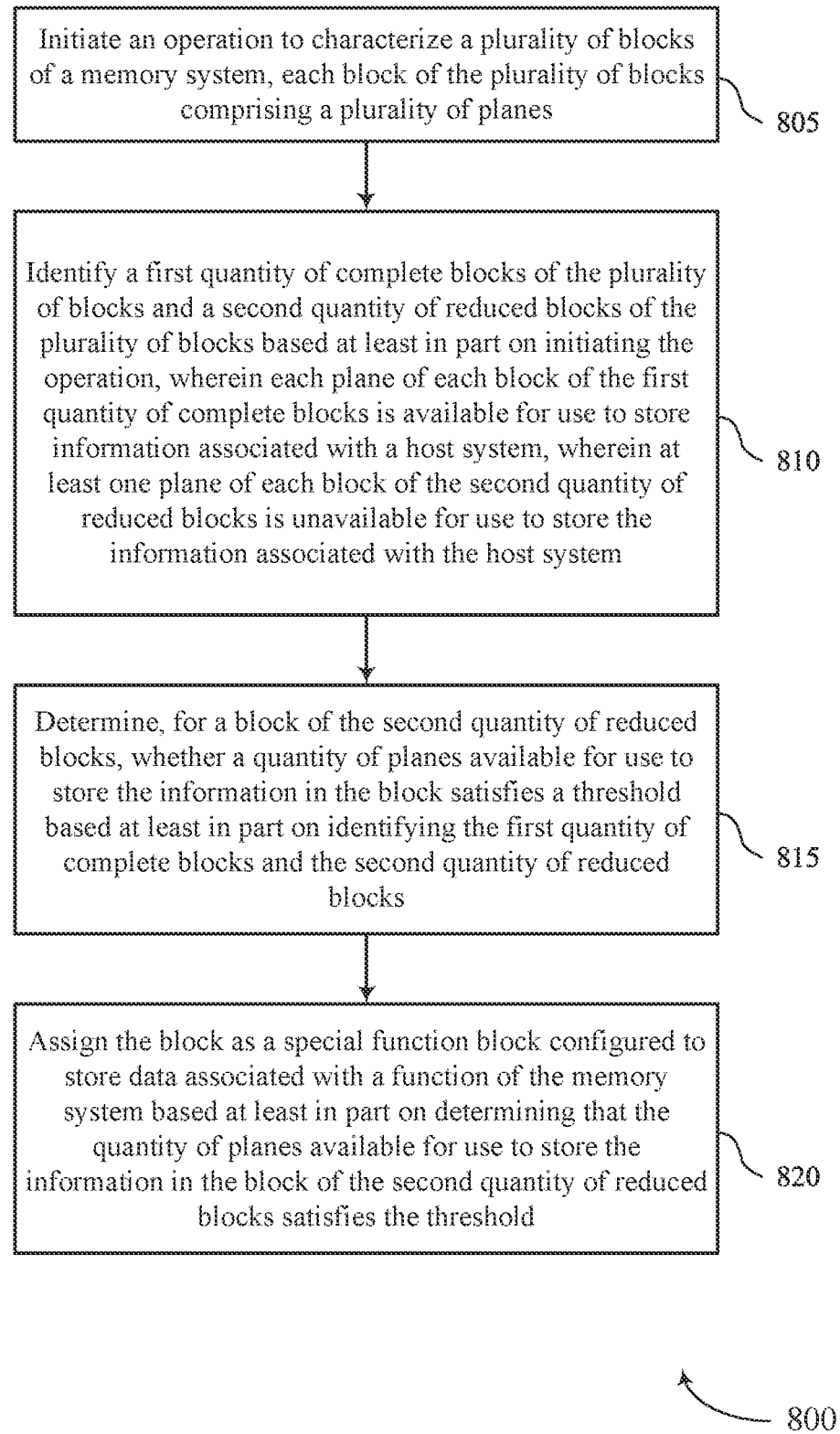
FIG. 8 shows a flowchart illustrating a method or methods that support assigning blocks of memory systems in accordance with examples as disclosed herein.

Features of the disclosure are initially described in the context of systems, devices, and circuits with reference to FIGS. 1 through 2. Features of the disclosure are described in the context of dividing virtual blocks for special function utilizing non-complete virtual blocks with reference to FIGS. 3 through 7. These and other features of the disclosure are further illustrated by and described in the context of an apparatus diagram and flowchart that relate to dividing blocks for special functions with reference to FIG. 8.

FIG. 1 illustrates an example of a system 100 that supports assigning blocks of memory systems in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, include static random access memory (SRAM) or other memory that may be used by the memory system controller 115 for internal storage or calculations, for example, related to the functions ascribed herein to the memory system controller 115. Additionally, or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally, or alternatively, rely on an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally, or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained, and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

The system 100 may include any quantity of non-transitory computer readable media that support assigning blocks of memory systems. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

Memory system 110 may include virtual blocks of memory having a plurality of memory planes, for example, six (6) separate planes of memory. Each virtual block may be classified as a compete virtual block in response to all memory planes being functional. Due to errors that may be introduced during fabrication of the die containing the memory planes, a subset of the virtual blocks may contain errors in which one or more of the memory planes are not fully functional. Complete virtual blocks of data are used as a virtual block having all memory planes function provides the higher system performance.

In response to the memory system being first initialized, the memory system controller 115 may determine which memory blocks may be classified as a complete block, which memory blocks may be classified as a reduced memory block, and which virtual blocks may be classified as non-functional virtual memory blocks. A complete memory block is a memory block having all of its memory planes fully functioning. In contrast, a reduced memory block is a memory block having some but not all memory planes fully functioning. For example, a memory device may include six (6) memory planes in which all six (6) memory planes function as designed. A reduced memory block may include four (4) or more fully functioning memory planes. A bad memory block is a memory block with less than four (4) fully functioning memory planes. Using these classifications for each virtual memory block, the memory system controller 115 may assign the reduced virtual memory blocks to one or more tasks associated with the function of the memory device 130 containing functional virtual data and assign the complete virtual blocks to store user host data, while eliminating the use of the non-functional virtual memory blocks as otherwise disclosed herein.

FIG. 2 illustrates an example of a system 200 that supports assigning blocks of memory systems in accordance with examples as disclosed herein. The system 200 may be an example of a system 100 as described with reference to FIG. 1, or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively.

The memory system 210 may include one or more memory devices 240 to store data transferred between the memory system 210 and the host system 205 (e.g., in response to receiving access commands from the host system 205). The memory devices 240 may include one or more memory devices as described with reference to FIG. 1. For example, the memory devices 240 may include NAND memory, PCM, self-selecting memory, 3D cross point or other chalcogenide-based memories, FERAM, MRAM, NOR (e.g., NOR flash) memory, STT-MRAM, CBRAM, RRAM, or OxRAM, among other examples.

The memory system 210 may include a storage controller 230 for controlling the passing of data directly to and from the memory devices 240 (e.g., for storing data, for retrieving data, for determining memory locations in which to store data and from which to retrieve data). The storage controller 230 may communicate with memory devices 240 directly or via a bus (not shown), which may include using a protocol specific to each type of memory device 240. In some cases, a single storage controller 230 may be used to control multiple memory devices 240 of the same or different types. In some cases, the memory system 210 may include multiple storage controllers 230 (e.g., a different storage controller 230 for each type of memory device 240). In some cases, a storage controller 230 may implement aspects of a local controller 135 as described with reference to FIG. 1.

The memory system 210 may include an interface 220 for communication with the host system 205, and a buffer 225 for temporary storage of data being transferred between the host system 205 and the memory devices 240. The interface 220, buffer 225, and storage controller 230 may support translating data between the host system 205 and the memory devices 240 (e.g., as shown by a data path 250), and may be collectively referred to as data path components.

Using the buffer 225 to temporarily store data during transfers may allow data to be buffered while commands are being processed, which may reduce latency between commands and may support arbitrary data sizes associated with commands. This may also allow bursts of commands to be handled, and the buffered data may be stored, or transmitted, or both (e.g., after a burst has stopped). The buffer 225 may include relatively fast memory (e.g., some types of volatile memory, such as SRAM or DRAM), or hardware accelerators, or both to allow fast storage and retrieval of data to and from the buffer 225. The buffer 225 may include data path switching components for bi-directional data transfer between the buffer 225 and other components.

A temporary storage of data within a buffer 225 may refer to the storage of data in the buffer 225 during the execution of access commands. For example, after completion of an access command, the associated data may no longer be maintained in the buffer 225 (e.g., may be overwritten with data for additional access commands). In some examples, the buffer 225 may be a non-cache buffer. For example, data may not be read directly from the buffer 225 by the host system 205. In some examples, read commands may be added to a queue without an operation to match the address to addresses already in the buffer 225 (e.g., without a cache address match or lookup operation).

The memory system 210 also may include a memory system controller 215 for executing the commands received from the host system 205, which may include controlling the data path components for the moving of the data. The memory system controller 215 may be an example of the memory system controller 115 as described with reference to FIG. 1. A bus 235 may be used to communicate between the system components.

In some cases, one or more queues (e.g., a command queue 260, a buffer queue 265, a storage queue 270) may be used to control the processing of access commands and the movement of corresponding data. This may be beneficial, for example, if more than one access command from the host system 205 is processed concurrently by the memory system 210. The command queue 260, buffer queue 265, and storage queue 270 are depicted at the interface 220, memory system controller 215, and storage controller 230, respectively, as examples of a possible implementation. However, queues, if implemented, may be positioned anywhere within the memory system 210.

Data transferred between the host system 205 and the memory devices 240 may be conveyed along a different path in the memory system 210 than non-data information (e.g., commands, status information). For example, the system components in the memory system 210 may communicate with each other using a bus 235, while the data may use the data path 250 through the data path components instead of the bus 235. The memory system controller 215 may control how and if data is transferred between the host system 205 and the memory devices 240 by communicating with the data path components over the bus 235 (e.g., using a protocol specific to the memory system 210).

If a host system 205 transmits access commands to the memory system 210, the commands may be received by the interface 220 (e.g., according to a protocol, such as a UFS protocol or an eMMC protocol). Thus, the interface 220 may be considered a front end of the memory system 210. After receipt of each access command, the interface 220 may communicate the command to the memory system controller 215 (e.g., via the bus 235). In some cases, each command may be added to a command queue 260 by the interface 220 to communicate the command to the memory system controller 215.

The memory system controller 215 may determine that an access command has been received based on the communication from the interface 220. In some cases, the memory system controller 215 may determine the access command has been received by retrieving the command from the command queue 260. The command may be removed from the command queue 260 after it has been retrieved (e.g., by the memory system controller 215). In some cases, the memory system controller 215 may cause the interface 220 (e.g., via the bus 235) to remove the command from the command queue 260.

After a determination that an access command has been received, the memory system controller 215 may execute the access command. For a read command, this may include obtaining data from one or more memory devices 240 and transmitting the data to the host system 205. For a write command, this may include receiving data from the host system 205 and moving the data to one or more memory devices 240. In either case, the memory system controller 215 may use the buffer 225 for, among other things, temporary storage of the data being received from or sent to the host system 205. The buffer 225 may be considered a middle end of the memory system 210. In some cases, buffer address management (e.g., pointers to address locations in the buffer 225) may be performed by hardware (e.g., dedicated circuits) in the interface 220, buffer 225, or storage controller 230.

To process a write command received from the host system 205, the memory system controller 215 may determine if the buffer 225 has sufficient available space to store the data associated with the command. For example, the memory system controller 215 may determine (e.g., via firmware, via controller firmware), an amount of space within the buffer 225 that may be available to store data associated with the write command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225. For example, pointers may be maintained that indicate where in the buffer 225 the data associated with each command is stored. Using the buffer queue 265, multiple access commands may be received sequentially from the host system 205 and at least portions of the access commands may be processed concurrently.

If the buffer 225 has sufficient space to store the write data, the memory system controller 215 may cause the interface 220 to transmit an indication of availability to the host system 205 (e.g., a "ready to transfer" indication), which may be performed in accordance with a protocol (e.g., a UFS protocol, an eMMC protocol). As the interface 220 receives the data associated with the write command from the host system 205, the interface 220 may transfer the data to the buffer 225 for temporary storage using the data path 250. In some cases, the interface 220 may obtain (e.g., from the buffer 225, from the buffer queue 265) the location within the buffer 225 to store the data. The interface 220 may indicate to the memory system controller 215 (e.g., via the bus 235) if the data transfer to the buffer 225 has been completed.

After the write data has been stored in the buffer 225 by the interface 220, the data may be transferred out of the buffer 225 and stored in a memory device 240, which may involve operations of the storage controller 230. For example, the memory system controller 215 may cause the storage controller 230 to retrieve the data from the buffer 225 using the data path 250 and transfer the data to a memory device 240. The storage controller 230 may be considered a back end of the memory system 210. The storage controller 230 may indicate to the memory system controller 215 (e.g., via the bus 235) that the data transfer to one or more memory devices 240 has been completed.

In some cases, a storage queue 270 may support a transfer of write data. For example, the memory system controller 215 may push (e.g., via the bus 235) write commands from the buffer queue 265 to the storage queue 270 for processing. The storage queue 270 may include entries for each access command. In some examples, the storage queue 270 may additionally include a buffer pointer (e.g., an address) that may indicate where in the buffer 225 the data associated with the command is stored and a storage pointer (e.g., an address) that may indicate the location in the memory devices 240 associated with the data. In some cases, the storage controller 230 may obtain (e.g., from the buffer 225, from the buffer queue 265, from the storage queue 270) the location within the buffer 225 from which to obtain the data. The storage controller 230 may manage the locations within the memory devices 240 to store the data (e.g., performing wear-leveling, performing garbage collection). The entries may be added to the storage queue 270 (e.g., by the memory system controller 215). The entries may be removed from the storage queue 270 (e.g., by the storage controller 230, by the memory system controller 215) after completion of the transfer of the data.

To process a read command received from the host system 205, the memory system controller 215 may determine if the buffer 225 has sufficient available space to store the data associated with the command. For example, the memory system controller 215 may determine (e.g., via firmware, via controller firmware), an amount of space within the buffer 225 that may be available to store data associated with the read command.

In some cases, the buffer queue 265 may support buffer storage of data associated with read commands in a similar manner as discussed with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250. The storage controller 230 may indicate to the memory system controller 215 (e.g., via the bus 235) if the data transfer to the buffer 225 has been completed.

In some cases, the storage queue 270 may be used to aid with the transfer of read data. For example, the memory system controller 215 may push the read command to the storage queue 270 for processing. In some cases, the storage controller 230 may obtain (e.g., from the buffer 225, from the storage queue 270) the location within one or more memory devices 240 from which to retrieve the data. In some cases, the storage controller 230 may obtain (e.g., from the buffer queue 265) the location within the buffer 225 to store the data. In some cases, the storage controller 230 may obtain (e.g., from the storage queue 270) the location within the buffer 225 to store the data. In some cases, the memory system controller 215 may move the command processed by the storage queue 270 back to the command queue 260.

Once the data has been stored in the buffer 225 by the storage controller 230, the data may be transferred from the buffer 225 and sent to the host system 205. For example, the memory system controller 215 may cause the interface 220 to retrieve the data from the buffer 225 using the data path 250 and transmit the data to the host system 205 (e.g., according to a protocol, such as a UFS protocol or an eMMC protocol). For example, the interface 220 may process the command from the command queue 260 and may indicate to the memory system controller 215 (e.g., via the bus 235) that the data transmission to the host system 205 has been completed.

The memory system controller 215 may execute received commands according to an order (e.g., a first-in-first-out order, according to the order of the command queue 260). For each command, the memory system controller 215 may cause data corresponding to the command to be moved into and out of the buffer 225, as discussed herein. As the data is moved into and stored within the buffer 225, the command may remain in the buffer queue 265. A command may be removed from the buffer queue 265 (e.g., by the memory system controller 215) if the processing of the command has been completed (e.g., if data corresponding to the access command has been transferred out of the buffer 225). If a command is removed from the buffer queue 265, the address previously storing the data associated with that command may be available to store data associated with a new command.

In some examples, the memory system controller 215 may be configured for operations associated with one or more memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 205 and physical addresses (e.g., physical block addresses) associated with memory cells within the memory devices 240. For example, the host system 205 may issue commands indicating one or more LBAs and the memory system controller 215 may identify one or more physical block addresses indicated by the LBAs. In some cases, one or more contiguous LBAs may correspond to noncontiguous physical block addresses. In some cases, the storage controller 230 may be configured to perform one or more of the described operations in conjunction with or instead of the memory system controller 215. In some cases, the memory system controller 215 may perform the functions of the storage controller 230 and the storage controller 230 may be omitted.

In response to the memory system being first initialized, the memory system controller 215 may determine which memory blocks may be classified as a complete memory block, which blocks may be classified as being reduced memory blocks, and which blocks may be classified as non-functional memory blocks. Using these classifications for each memory block, the memory system controller 215 may assign the reduced memory blocks to one or more tasks associated with the function of the memory device 130 containing functional virtual data, assign the complete blocks to store user host data, while eliminating the use of the non-functional memory blocks as otherwise disclosed herein.

Figure 3:
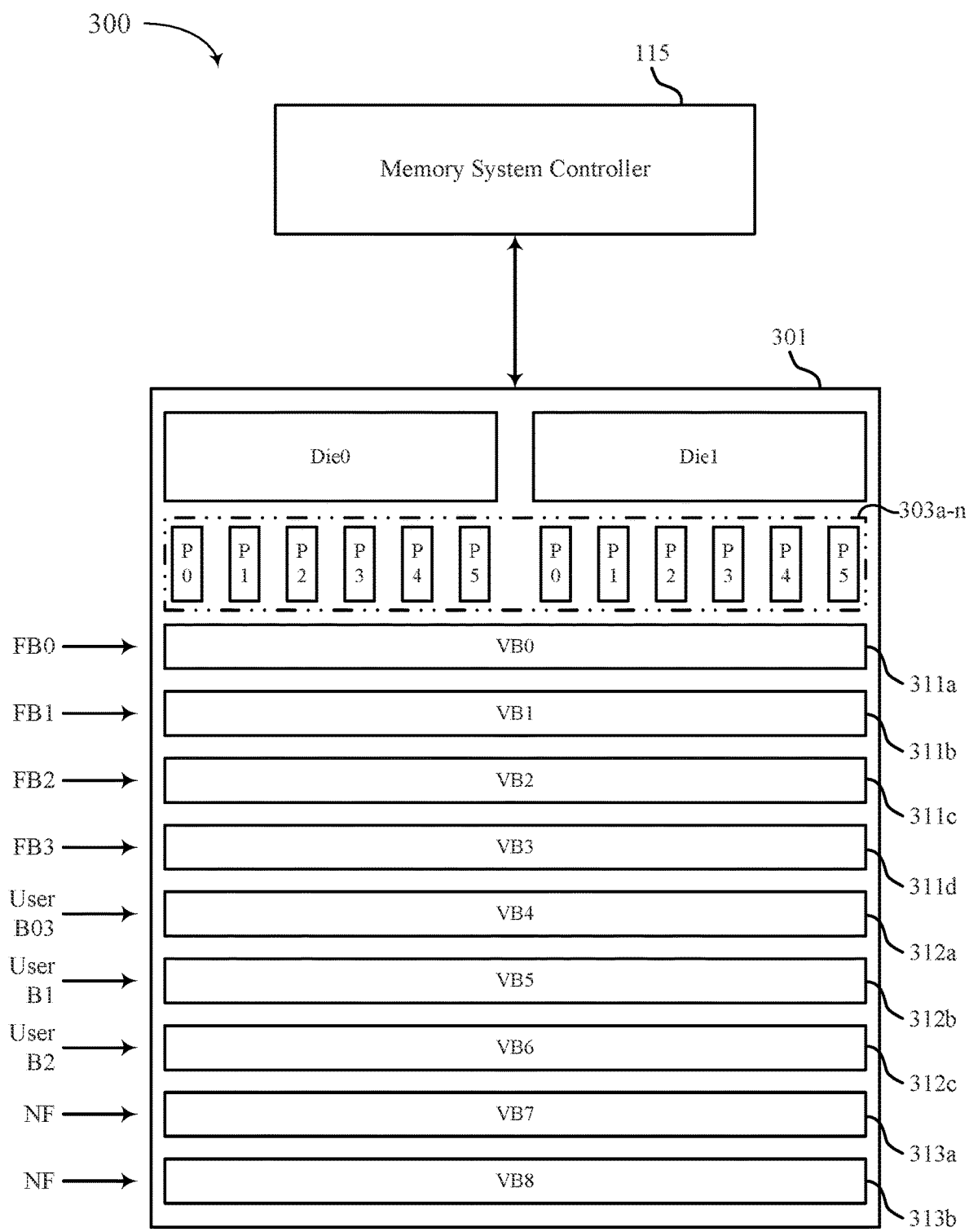
FIG. 3 illustrates an example of a system that supports assigning blocks of memory systems in accordance with examples as disclosed herein.

FIG. 3 illustrates an example of a memory system 300 that supports dividing blocks for special functions in accordance with examples as disclosed herein. The memory device 301 may include data critical to initial operation of the manufactured device that is used during an initial configuration of the manufactured device. The memory system controller 115 that is part of the memory system 110 is used to process commands that receive and store data within the memory planes 303a-n. The data is organized into blocks of data addressed by LBAs to determine which memory blocks may be classified as a complete virtual block, which virtual memory blocks may be classified as reduced virtual memory blocks, and which virtual blocks may be classified as non-functional virtual memory blocks.

The memory system 300 includes a sequence of memory blocks based upon the logical address for a starting address for the block of data and a length of the block or a range of logical addresses within each block of data. The blocks of data within the memory system 300 include virtual blocks 311a-d of user data, blocks of functional virtual block data 312a-b, and virtual blocks 313a-b that are not functional. The location and size of these blocks are defined within the memory device 301 in response to initialization of the memory device 301 by the memory system controller 115.

During operation, the complete virtual blocks of memory 311a-d may be used to store data received from a host system. The memory device 301 may also use a set of functional virtual blocks to maintain data associated with the operation of the memory device 301 by the memory system controller 115. In some existing NAND memory systems, special functional blocks may be utilized to maintain data associated with the functional operation of the memory device. These memory systems may be adjusted to add more memory planes within the dies of the memory system to increase the storage capacity of the memory systems. In some cases, special functions may be assigned one or more block memories. As the size of blocks increase (e.g., due to the addition of more memory planes), it may increase a waste of memory applied to some special functions. For example, sometimes even a single block may provide more storage space than will be used by the special function and thus over-provisioning costs of the special functional blocks using current maintenance techniques may be larger as the size of the blocks increase. Reduction of the over-provisioning costs of the special functional blocks may be useful to provide efficient use of the additional storage capacity of the new devices.

FIG. 3 illustrates an example of a map 300 of special functions mapped to reduced blocks that supports assigning blocks of memory systems in accordance with examples as disclosed herein. NAND memory device includes two memory die 411-412 having a plurality of memory blocks. In some cases, the memory device stores host user data only in complete memory blocks. A memory block is classified as a complete memory block in response to all memory planes 431a-f being functional.

Figure 4:
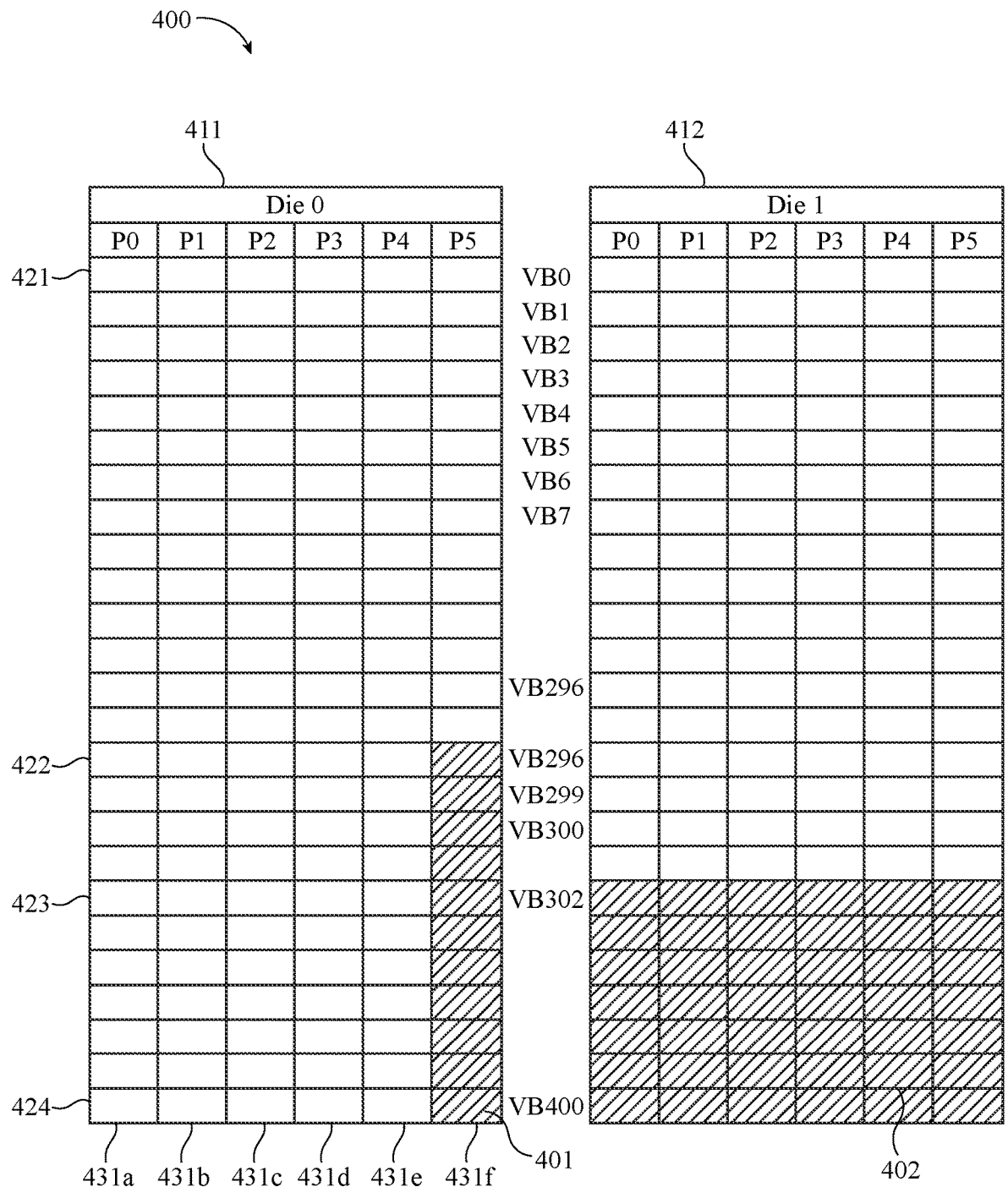
FIG. 4 illustrates an example of a map of special functions mapped to reduced blocks that supports assigning blocks of memory systems in accordance with examples as disclosed herein.

The NAND memory device may be considered a qualified memory device if a quantity of blocks of memory have all memory planes 431a-f fully functioning is greater than minimum quantity of complete blocks. In some memory devices, the quantity of complete memory blocks used to consider the memory device to be a qualified memory device included the host user data memory blocks and also the functional memory blocks. In FIG. 4, Diet) 411 is shown to have one memory plane containing non-functioning planes 401-402. In this example, blocks 298-401 contain bad cells in plane 5 421e. In contrast, Die 1 412 contains non-functioning memory planes 402 in all six (6) planes 431a-f of blocks.

In the operation of some memory devices, a minimum quantity of complete memory blocks to be qualified may be a particular value, for example 300. In this example, Die 0 411 would not be qualified memory device as blocks VB0-VB297 421-422 would be fully functioning. In contrast, Die 1 412, many more cells are non-functional, however, these non-functional cells are located in memory blocks VB302-VB400 422, 424. As such, Die 1 412 may contain 302 complete memory blocks while Die 0 411 may contain 298 complete memory blocks.

Functional memory blocks in some memory devices are stored using four (4) memory planes 431a-d. If two (2) additional memory planes 431e-f are added to memory device, the storage requirements for the information associated with special functions that is stored by functional memory blocks may not increase significantly. The two additional memory planes scale to increase the storage capacity of the memory device to store host user data in the complete memory blocks. Further, the addition of two memory planes may increase a likelihood that a virtual block may be a reduced block or a partially good block.

Die 0 411 may however include a quantity of memory blocks VB298-400 422, 424 that contain 5 fully functional memory planes 431*a-e*. These memory blocks may be considered reduced memory blocks if they have at least four (4) fully functioning memory planes 431*a-f* in the memory block. As such, the functional memory block data may be stored in Die 0 411 in these reduced memory blocks without a performance reduction as compared to four (4) memory plane 431*a-f* memory devices. By moving the functional memory block data from complete memory blocks to the reduced memory blocks permits more of the complete memory blocks to be used for storing host user data. This reassignment of functional memory block data may also reduce the minimum quantity of complete memory blocks used to store host user data into complete memory blocks as the memory blocks currently assigned to store functional memory blocks are used to store host user data. In such examples, a memory system may be accepted or may be classified to a higher grade of memory system using fewer complete memory blocks because some special functions are mapped to reduced virtual blocks. The result of this reassignment produces an increase yield in qualified memory devices for use in systems.

FIG. 4 illustrates an example of a map 400 of special functions mapped to reduced blocks that supports assigning blocks of memory systems in accordance with examples as disclosed herein. NAND memory device is shown having a memory blocks VBi 501 in which 2 of the 6 memory planes contain non-functioning memory planes 521*a-b*, for example memory planes P1 531*b* and P3 531*d*. A second memory block VBj 502 also includes 2 of the 6 memory planes contain non-functioning memory planes 522*a-b*, for example memory planes P2 531*c* and P4 531*e*. In such examples, the memory system controller 115 may classify memory block VBi 501 as a TEMP memory block and may classify VBj 502 as a replacement memory block.

Figure 5:
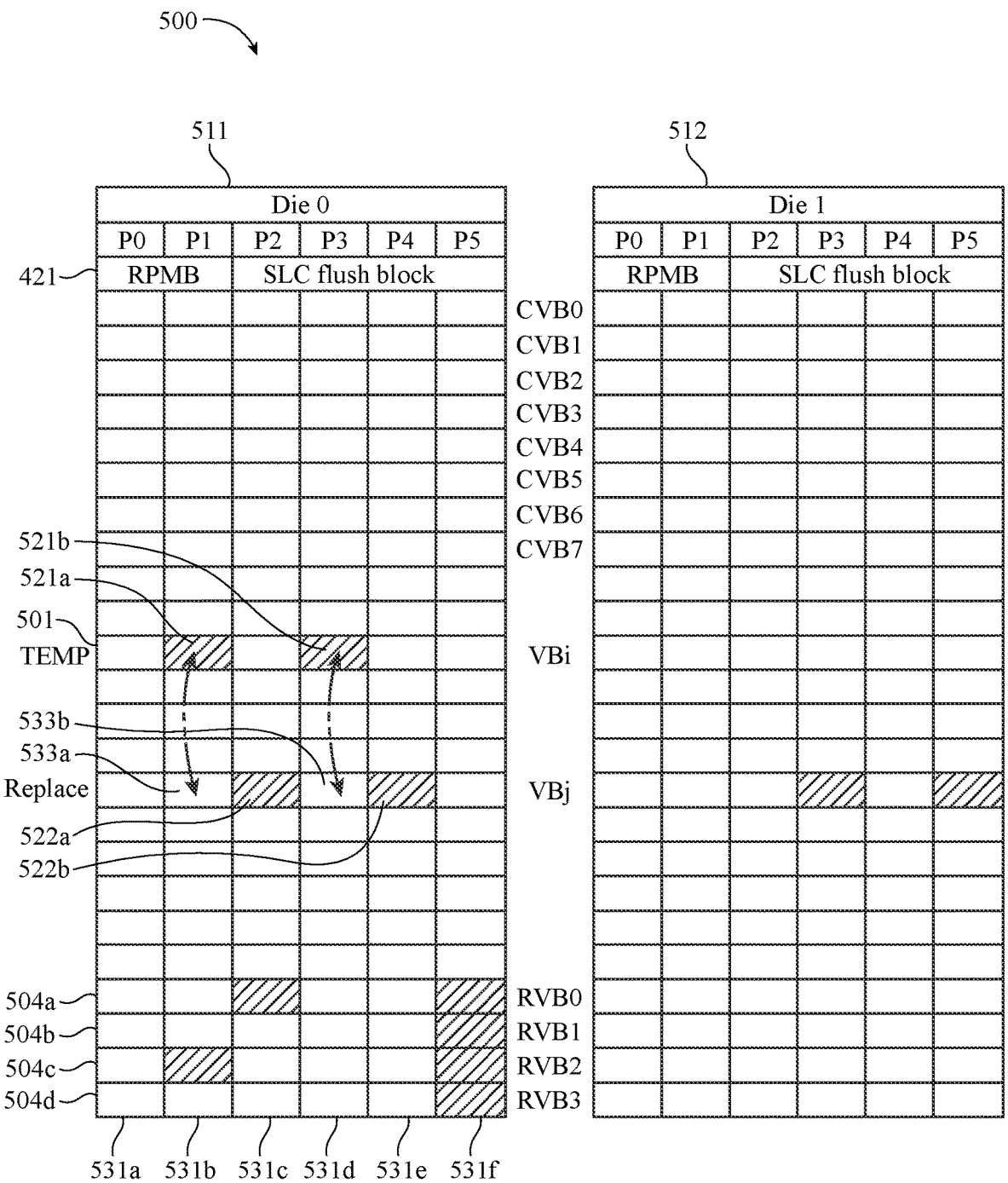
FIG. 5 illustrates an example of a map of special functions mapped to reduced blocks that supports assigning blocks of memory systems in accordance with examples as disclosed herein.

The memory system controller 115 may use two functional memory planes 533*a-b* in memory block VBj 502 as replacement planes for two non-functional memory planes 534*a-n* in memory block VBi 501. This arrangement transforms memory block VBI 501 into a complete memory block having all memory planes be functional and also reduces the functionality of other memory blocks that provided the replacement planes. The memory system controller 115 stores data into VBi 501 and VBj 502 in response to a write into a single memory block as each memory plane may be accessed independently. In response to the memory system controller 115 reading data from memory block VBi 501, the contents stored in two replacement planes 533*a-b* are inserted into the data read from memory block VBi 501 before the data is transferred to a host system. While the example of FIG. 5 shows use of replacement planes in Die 0 511, similar mapping of memory blocks may occur in any memory die 511-512 and any memory plane.

Figure 6:
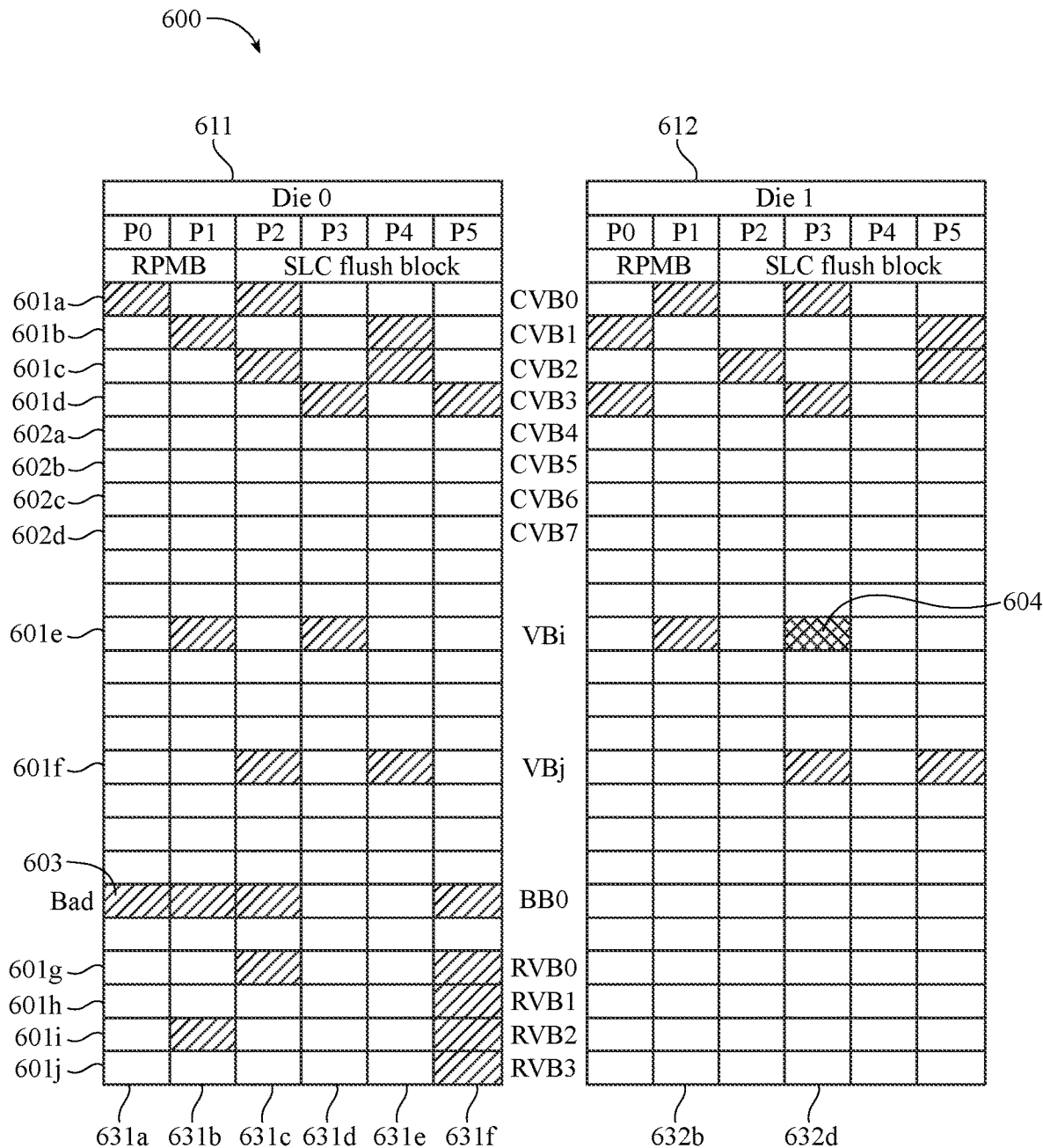
FIG. 6 illustrates an example of a map of special functions mapped to reduced blocks that supports assigning blocks of memory systems in accordance with examples as disclosed herein.
Figure 7:
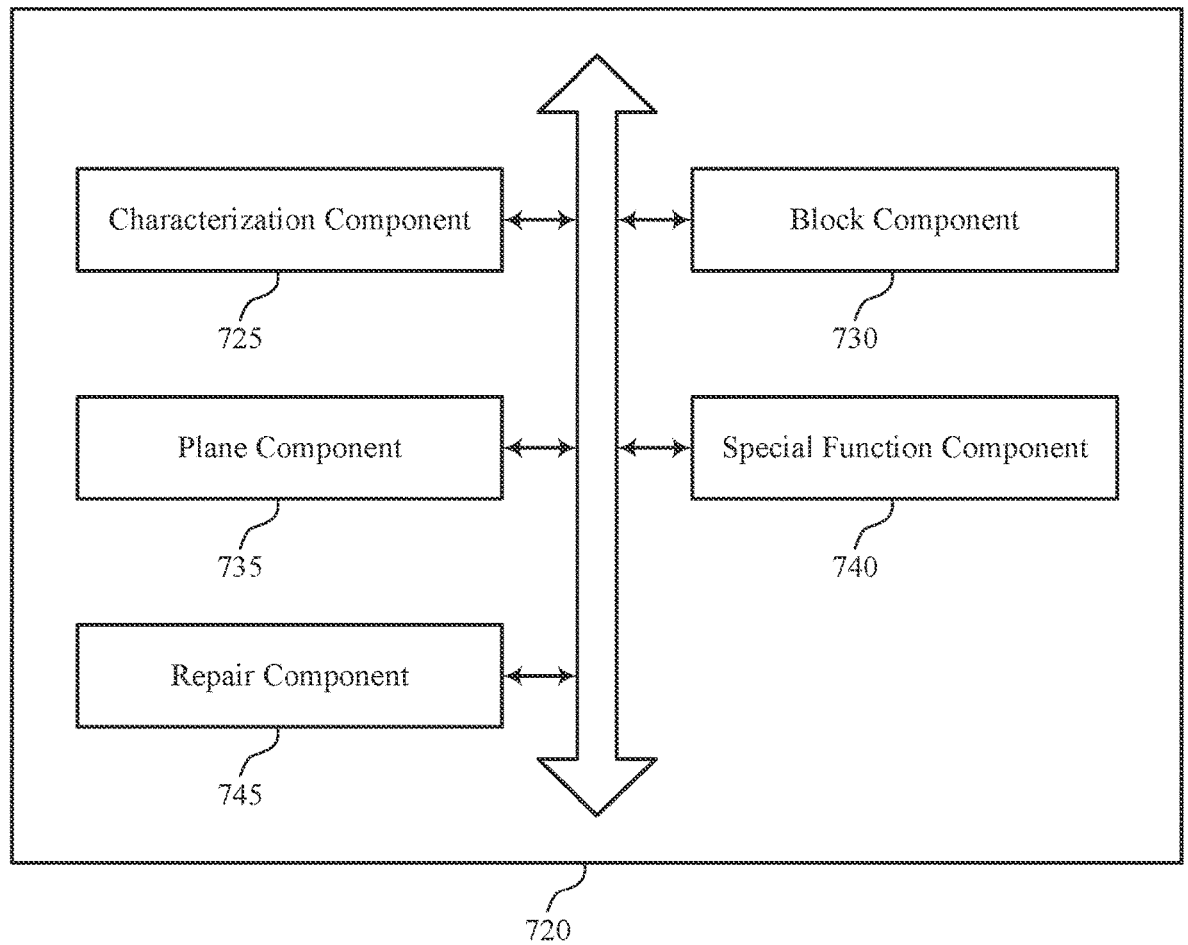
FIG. 7 shows a block diagram of a memory system that supports assigning blocks of memory systems in accordance with examples as disclosed herein.

FIG. 6 illustrates an example of a map 600 of special functions mapped to reduced blocks that supports assigning blocks of memory systems in accordance with examples as disclosed herein. In the example of FIG. 6, NAND memory device includes a pair of memory die 411-412, each of which includes a set of six (6) memory planes 631*a-f*. Each memory block spans but Die 0 611 and Die 1 612. Each memory block may be classified as a reduced memory block 601*a-j*, a complete memory block 602*a-d*, and a bad or non-functioning memory block 603. A reduced memory block corresponds to a memory block having at least four (4), but not all, functioning memory planes 631*a-f*. A complete memory block 602*a-d* corresponds to a memory block have all memory planes 631*a-f* functioning. A bad memory block 603 corresponds to a memory block having less than 4 functioning memory planes 631*a-f*.

The reduced memory blocks 601*a-j* may be used to create a pool of virtual memory blocks that the memory system controller 115 assigns to maintain data associated with special functions of the memory device. The functional virtual memory blocks include storing data for temporary backup data (such as power loss events), storing journaling data, storing error control information, storing single-level cell flushing block data, storing data associated with replay-protected memory blocks (RPMB), or any combination thereof. The example of FIG. 6 shows RPMB data stored in memory planes P0 631*a* and P1 631*b* and SLC flushing block data stored in memory planes P2-P5 631*c-f*.

The reduced memory blocks 601*a-j*, which are labeled RVB(n), contain one or more bad memory planes. For example, memory block RVB0 601*a* has two bad memory planes in memory plane P0 631*a* and P2 631*c* within Die 0 611. Memory block RVB0 601*a* also has two bad memory planes in memory plane P1 631*b* and P3 631*d* within Die 1 612. The four functioning planes in memory block RVB0 601*a* may be used to store the RPMB data and the SLC flushing block data associated with the functional virtual planes. This assignment of functional virtual memory block data is performed for each of the reduced memory blocks 601*a-j*. More of the complete memory blocks 602*a-d* may be assigned to store host user data. The memory system controller 115 may assign the bad memory blocks 603 to be not utilized for any data storage.

The memory blocks may be configured to operate as virtual memory blocks permitting the functional virtual memory block data to be addressed in a consistent manner programmatically with the assignment of virtual blocks to particular memory blocks to be managed by the memory system controller 115. Additionally, the functional virtual memory block data may be moved from one reduced memory block 601*a-j* to another reduced memory block 601*a-j* as part of the operation of the NAND memory device in response to the memory system controller 115 performing memory block erase operations, garbage collection operations, and wear leveling operations on memory device.

Additionally, a reduced memory block, for example VBi 601*e*, may have 5 functional memory planes in one of the memory Die 611-612. In memory block VBi 601*e* of Die 1 612, only memory plane P1 632*b* is shown having a non-functioning memory plane. In such a situation, the memory system controller 115 may assign one of the remaining functional memory planes, for example P3 632*d* to be assigned as an unused plane 604. This arrangement permits the memory system controller 115 to treat the reduced memory blocks containing functional virtual block data identically without mapping the data differently than other reduced memory blocks containing functional virtual block data. The system memory controller 115 may assign any of the functional memory planes in memory block VBI 601*e* of Die 1 612 to any of the 5 functional memory planes.

FIG. 5 shows a block diagram 500 of a memory system 520 that supports assigning blocks of memory systems in accordance with examples as disclosed herein. The memory system 520 may be an example of aspects of a memory system as described with reference to FIGS. 1 through 4. The memory system 520, or various components thereof, may be an example of means for performing various aspects of assigning blocks of memory systems as described herein. For example, the memory system 520 may include a characterization component 525, a block component 530, a plane component 535, a special function component 540, a repair component 545, or any combination thereof. Each of these components may communicate, directly or indirectly, with one another (e.g., via one or more buses).

The characterization component 525 may be configured as or otherwise support a means for initiating an operation to characterize a plurality of blocks of a memory system, each block of the plurality of blocks including a plurality of planes. The block component 530 may be configured as or otherwise support a means for identifying a first quantity of complete blocks of the plurality of blocks and a second quantity of reduced blocks of the plurality of blocks based at least in part on initiating the operation, where each plane of each block of the first quantity of complete blocks is available for use to store information associated with a host system, where at least one plane of each block of the second quantity of reduced blocks is unavailable for use to store the information associated with the host system. The plane component 535 may be configured as or otherwise support a means for determining, for a block of the second quantity of reduced blocks, whether a quantity of planes available for use to store the information in the block satisfies a threshold based at least in part on identifying the first quantity of complete blocks and the second quantity of reduced blocks. The special function component 540 may be configured as or otherwise support a means for assigning the block as a special function block configured to store data associated with a function of the memory system based at least in part on determining that the quantity of planes available for use to store the information in the block of the second quantity of reduced blocks satisfies the threshold.

In some examples, the plane component 535 may be configured as or otherwise support a means for determining whether the block includes a plane that is unavailable for use to store the information associated with the host system based at least in part on one or more errors associated with the plane, where identifying the second quantity of reduced blocks of the plurality is based at least in part on determining whether the block of the plurality of blocks includes the plane that is unavailable.

In some examples, the repair component 545 may be configured as or otherwise support a means for assigning a second block of the second quantity of reduced blocks as a repaired blocks configured to place a bad plane of the second block with a good plane of a different block of the second quantity of reduced blocks based at least in part on identifying the second quantity of reduced blocks. In some examples, the repair component 545 may be configured as or otherwise support a means for assigning a third block of the second quantity of reduced blocks as a replacement block configured to use one or more of its good planes as replacement planes for other blocks of the second quantity of reduced blocks.

In some examples, the repair component 545 may be configured as or otherwise support a means for replacing the bad plane of the second block with a good plane of the third block. In some examples, the repair component 545 may be configured as or otherwise support a means for assigning the second block as a complete block based at least in part on replacing the bad plane of the second block.

In some examples, the block component 530 may be configured as or otherwise support a means for determining, for a second block of the second quantity of reduced blocks, whether the quantity of planes available for use to store the information in the block satisfies a second threshold that is less than the threshold based at least in part on identifying the first quantity of complete blocks and the second quantity of reduced blocks. In some examples, the block component 530 may be configured as or otherwise support a means for assigning the second block of the second quantity of reduced blocks as a bad block unavailable for storing data based at least in part on determining that the quantity of planes available for use to store the information in the block of the second quantity of reduced blocks satisfies the second threshold.

In some examples, the function of the memory system that is associated with the special function block includes storing data for power loss events, storing journaling data, storing error control information, storing small-chunk single-level cell data, storing data associated with replay-protected memory blocks, or any combination thereof.

In some examples, the plurality of planes in each block includes six.

In some examples, the threshold associated with the quantity of planes available for use to store the information in the block of the second quantity of reduced blocks includes four.

In some examples, the plurality of blocks includes a plurality of virtual blocks.

In some examples, the plane component 535 may be configured as or otherwise support a means for determining whether the quantity of planes available for use to store the information in the block of the second quantity of reduced blocks is greater than the threshold based at least in part on identifying the second quantity of reduced blocks.

In some examples, the special function component 540 may be configured as or otherwise support a means for assigning one or more of the quantity of planes available for use to store the information in the block of the second quantity of reduced blocks as unavailable making an updated quantity of planes available for use to store the information in the block of the second quantity of reduced blocks equaling the threshold.

In some examples, each block of the second quantity of reduced blocks of the plurality of blocks storing data associated with a special function utilize a single level cell.

FIG. 6 shows a flowchart illustrating a method 600 that supports assigning blocks of memory systems in accordance with examples as disclosed herein. The operations of method 600 may be implemented by a memory system or its components as described herein. For example, the operations of method 600 may be performed by a memory system as described with reference to FIGS. 1 through 5. In some examples, a memory system may execute a set of instructions to control the functional elements of the device to perform the described functions. Additionally, or alternatively, the memory system may perform aspects of the described functions using special-purpose hardware.

Aspects of the method 600 may be implemented by a controller, among other components. Additionally or alternatively, aspects of the method 600 may be implemented as instructions stored in memory (e.g., firmware stored in a memory coupled with a controller). For example, the instructions, when executed by a controller, may cause the controller to perform the operations of the method 600.

At 605, the method may include initiating an operation to characterize a plurality of blocks of a memory system, each block of the plurality of blocks including a plurality of planes. The operations of 605 may be performed in accordance with examples as disclosed herein. In some examples, aspects of the operations of 605 may be performed by a characterization component 525 as described with reference to FIG. 5.

At 610, the method may include identifying a first quantity of complete blocks of the plurality of blocks and a second quantity of reduced blocks of the plurality of blocks based at least in part on initiating the operation, where each plane of each block of the first quantity of complete blocks is available for use to store information associated with a host system, where at least one plane of each block of the second quantity of reduced blocks is unavailable for use to store the information associated with the host system. The operations of 610 may be performed in accordance with examples as disclosed herein. In some examples, aspects of the operations of 610 may be performed by a block component 530 as described with reference to FIG. 5.

At 615, the method may include determining, for a block of the second quantity of reduced blocks, whether a quantity of planes available for use to store the information in the block satisfies a threshold based at least in part on identifying the first quantity of complete blocks and the second quantity of reduced blocks. The operations of 615 may be performed in accordance with examples as disclosed herein. In some examples, aspects of the operations of 615 may be performed by a plane component 535 as described with reference to FIG. 5.

At 620, the method may include assigning the block as a special function block configured to store data associated with a function of the memory system based at least in part on determining that the quantity of planes available for use to store the information in the block of the second quantity of reduced blocks satisfies the threshold. The operations of 620 may be performed in accordance with examples as disclosed herein. In some examples, aspects of the operations of 620 may be performed by a special function component 540 as described with reference to FIG. 5.

In some examples, an apparatus as described herein may perform a method or methods, such as the method 600. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for initiating an operation to characterize a plurality of blocks of a memory system, each block of the plurality of blocks including a plurality of planes; identifying a first quantity of complete blocks of the plurality of blocks and a second quantity of reduced blocks of the plurality of blocks based at least in part on initiating the operation, where each plane of each block of the first quantity of complete blocks is available for use to store information associated with a host system, where at least one plane of each block of the second quantity of reduced blocks is unavailable for use to store the information associated with the host system; determining, for a block of the second quantity of reduced blocks, whether a quantity of planes available for use to store the information in the block satisfies a threshold based at least in part on identifying the first quantity of complete blocks and the second quantity of reduced blocks; and assigning the block as a special function block configured to store data associated with a function of the memory system based at least in part on determining that the quantity of planes available for use to store the information in the block of the second quantity of reduced blocks satisfies the threshold.

Aspect 2: The method, apparatus, or non-transitory computer-readable medium of aspect 1, further including operations, features, circuitry, logic, means, or instructions, or any combination thereof for determining whether the block includes a plane that is unavailable for use to store the information associated with the host system based at least in part on one or more errors associated with the plane, where identifying the second quantity of reduced blocks of the plurality is based at least in part on determining whether the block of the plurality of blocks includes the plane that is unavailable.

Aspect 3: The method, apparatus, or non-transitory computer-readable medium of any of aspects 1 through 2, further including operations, features, circuitry, logic, means, or instructions, or any combination thereof for assigning a second block of the second quantity of reduced blocks as a repaired blocks configured to place a bad plane of the second block with a good plane of a different block of the second quantity of reduced blocks based at least in part on identifying the second quantity of reduced blocks and assigning a third block of the second quantity of reduced blocks as a replacement block configured to use one or more of its good planes as replacement planes for other blocks of the second quantity of reduced blocks.

Aspect 4: The method, apparatus, or non-transitory computer-readable medium of aspect 3, further including operations, features, circuitry, logic, means, or instructions, or any combination thereof for replacing the bad plane of the second block with a good plane of the third block and assigning the second block as a complete block based at least in part on replacing the bad plane of the second block.

Aspect 5: The method, apparatus, or non-transitory computer-readable medium of any of aspects 1 through 4, further including operations, features, circuitry, logic, means, or instructions, or any combination thereof for determining, for a second block of the second quantity of reduced blocks, whether the quantity of planes available for use to store the information in the block satisfies a second threshold that is less than the threshold based at least in part on identifying the first quantity of complete blocks and the second quantity of reduced blocks and assigning the second block of the second quantity of reduced blocks as a bad block unavailable for storing data based at least in part on determining that the quantity of planes available for use to store the information in the block of the second quantity of reduced blocks satisfies the second threshold.

Aspect 6: The method, apparatus, or non-transitory computer-readable medium of any of aspects 1 through 5, where the function of the memory system that is associated with the special function block includes storing data for power loss events, storing journaling data, storing error control information, storing small-chunk single-level cell data, storing data associated with replay-protected memory blocks, or any combination thereof Aspect 7: The method, apparatus, or non-transitory computer-readable medium of any of aspects 1 through 6, where the plurality of planes in each block includes six.

Aspect 8: The method, apparatus, or non-transitory computer-readable medium of any of aspects 1 through 7, where the threshold associated with the quantity of planes available for use to store the information in the block of the second quantity of reduced blocks includes four.

Aspect 9: The method, apparatus, or non-transitory computer-readable medium of any of aspects 1 through 8, where the plurality of blocks includes a plurality of virtual blocks.

Aspect 10: The method, apparatus, or non-transitory computer-readable medium of any of aspects 1 through 9, further including operations, features, circuitry, logic, means, or instructions, or any combination thereof for determining whether the quantity of planes available for use to store the information in the block of the second quantity of reduced blocks is greater than the threshold based at least in part on identifying the second quantity of reduced blocks.

Aspect 11: The method, apparatus, or non-transitory computer-readable medium of aspect 10, further including operations, features, circuitry, logic, means, or instructions, or any combination thereof for assigning one or more of the quantity of planes available for use to store the information in the block of the second quantity of reduced blocks as unavailable making an updated quantity of planes available for use to store the information in the block of the second quantity of reduced blocks equaling the threshold.

Aspect 12: The method, apparatus, or non-transitory computer-readable medium of any of aspects 10 through 11, where each block of the second quantity of reduced blocks of the plurality of blocks storing data associated with a special function utilize a single level cell.

It should be noted that the described techniques include possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed, and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed, and second condition or action may occur directly as a result of the previous condition or action occurring independent of whether other conditions or actions occur. In some examples, a first condition or action may be performed, and second condition or action may occur directly as a result of the previous condition or action occurring, such that no other intermediate conditions or actions occur between the earlier condition or action and the second condition or action, or a limited quantity of one or more intermediate steps or actions occur between the earlier condition or action and the second condition or action. Any condition or action described herein as being performed "based on," "based at least in part on," or "in response to" some other step, action, event, or condition may additionally, or alternatively (e.g., in an alternative example), be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
a controller associated with a memory device, wherein the controller is configured to cause the apparatus to:
initiate an operation to characterize a plurality of blocks of a memory system, each block of the plurality of blocks comprising a plurality of planes;
identify a first quantity of complete blocks of the plurality of blocks and a second quantity of reduced blocks of the plurality of blocks based at least in part on initiating the operation, wherein each plane of each block of the first quantity of complete blocks is available for use to store information associated with a host system, wherein at least one plane of each block of the second quantity of reduced blocks is unavailable for use to store the information associated with the host system;

determine, for a block of the second quantity of reduced blocks, whether a quantity of planes available for use to store the information in the block satisfies a threshold based at least in part on identifying the first quantity of complete blocks and the second quantity of reduced blocks; and assign the block as a special function block configured to store data associated with a function of the memory system based at least in part on determining that the quantity of planes available for use to store the information in the block of the second quantity of reduced blocks satisfies the threshold.

2. The apparatus of claim 1, wherein the controller is further configured to cause the apparatus to:

determine whether the block includes a plane that is unavailable for use to store the information associated with the host system based at least in part on one or more errors associated with the plane, wherein identifying the second quantity of reduced blocks of the plurality is based at least in part on determining whether the block of the plurality of blocks includes the plane that is unavailable.

3. The apparatus of claim 1, wherein the controller is further configured to cause the apparatus to:

assign a second block of the second quantity of reduced blocks as a repaired blocks configured to place a bad plane of the second block with a good plane of a different block of the second quantity of reduced blocks based at least in part on identifying the second quantity of reduced blocks; and assign a third block of the second quantity of reduced blocks as a replacement block configured to use one or more of its good planes as replacement planes for other blocks of the second quantity of reduced blocks.

4. The apparatus of claim 3, wherein the controller is further configured to cause the apparatus to:

replace the bad plane of the second block with a good plane of the third block; and assign the second block as a complete block based at least in part on replacing the bad plane of the second block.

5. The apparatus of claim 1, wherein the controller is further configured to cause the apparatus to:

determine, for a second block of the second quantity of reduced blocks, whether the quantity of planes available for use to store the information in the block satisfies a second threshold that is less than the threshold based at least in part on identifying the first quantity of complete blocks and the second quantity of reduced blocks; and assign the second block of the second quantity of reduced blocks as a bad block unavailable for storing data based at least in part on determining that the quantity of planes available for use to store the information in the block of the second quantity of reduced blocks satisfies the second threshold.

6. The apparatus of claim 1, wherein the function of the memory system that is associated with the special function block comprises storing data for power loss events, storing journaling data, storing error control information, storing small-chunk single-level cell data, storing data associated with replay-protected memory blocks, or any combination thereof.

7. The apparatus of claim 1, wherein the plurality of planes in each block comprises six.

8. The apparatus of claim 1, wherein the threshold associated with the quantity of planes available for use to store the information in the block of the second quantity of reduced blocks comprises four.

9. The apparatus of claim 1, wherein the plurality of blocks comprises a plurality of virtual blocks.

10. The apparatus of claim 1, wherein the controller is further configured to cause the apparatus to:

determine whether the quantity of planes available for use to store the information in the block of the second quantity of reduced blocks is greater than the threshold based at least in part on identifying the second quantity of reduced blocks.

11. The apparatus of claim 10, wherein the controller is further configured to cause the apparatus to:

assign one or more of the quantity of planes available for use to store the information in the block of the second quantity of reduced blocks as unavailable making an updated quantity of planes available for use to store the information in the block of the second quantity of reduced blocks equaling the threshold.

12. The apparatus of claim 10, wherein each block of the second quantity of reduced blocks of the plurality of blocks storing data associated with a special function utilize a single level cell.

13. A non-transitory computer-readable medium storing code, the code comprising instructions executable by a processor to:

initiate an operation to characterize a plurality of blocks of a memory system, each block of the plurality of blocks comprising a plurality of planes;

identify a first quantity of complete blocks of the plurality of blocks and a second quantity of reduced blocks of the plurality of blocks based at least in part on initiating the operation, wherein each plane of each block of the first quantity of complete blocks is available for use to store information associated with a host system, wherein at least one plane of each block of the second quantity of reduced blocks is unavailable for use to store the information associated with the host system;

determine, for a block of the second quantity of reduced blocks, whether a quantity of planes available for use to store the information in the block satisfies a threshold based at least in part on identifying the first quantity of complete blocks and the second quantity of reduced blocks; and assign the block as a special function block configured to store data associated with a function of the memory system based at least in part on determining that the quantity of planes available for use to store the information in the block of the second quantity of reduced blocks satisfies the threshold.

14. The non-transitory computer-readable medium of claim 13, wherein the instructions are further executable by the processor to:

determine whether the block includes a plane that is unavailable for use to store the information associated with the host system based at least in part on one or more errors associated with the plane, wherein identifying the second quantity of reduced blocks of the plurality is based at least in part on determining whether the block of the plurality of blocks includes the plane that is unavailable.

15. The non-transitory computer-readable medium of claim 13, wherein the instructions are further executable by the processor to:

assign a second block of the second quantity of reduced blocks as a repaired blocks configured to place a bad plane of the second block with a good plane of a different block of the second quantity of reduced blocks based at least in part on identifying the second quantity of reduced blocks; and assign a third block of the second quantity of reduced blocks as a replacement block configured to use one or more of its good planes as replacement planes for other blocks of the second quantity of reduced blocks.

16. The non-transitory computer-readable medium of claim 15, wherein the instructions are further executable by the processor to:

replace the bad plane of the second block with a good plane of the third block; and assign the second block as a complete block based at least in part on replacing the bad plane of the second block.

17. The non-transitory computer-readable medium of claim 13, wherein the instructions are further executable by the processor to:

determine, for a second block of the second quantity of reduced blocks, whether the quantity of planes available for use to store the information in the block satisfies a second threshold that is less than the threshold based at least in part on identifying the first quantity of complete blocks and the second quantity of reduced blocks; and assign the second block of the second quantity of reduced blocks as a bad block unavailable for storing data based at least in part on determining that the quantity of planes available for use to store the information in the block of the second quantity of reduced blocks satisfies the second threshold.

18. The non-transitory computer-readable medium of claim 13, wherein the function of the memory system that is associated with the special function block comprises storing data for powerless events, storing journaling data, storing error control information, storing small-chunk single-level cell data, storing data associated with replay-protected memory blocks, or any combination thereof.

19. The non-transitory computer-readable medium of claim 13, wherein:

the plurality of planes in each block comprises six.

20. The non-transitory computer-readable medium of claim 13, wherein the threshold associated with the quantity of planes available for use to store the information in the block of the second quantity of reduced blocks comprises four.

21. The non-transitory computer-readable medium of claim 13, wherein the plurality of blocks comprises a plurality of virtual blocks.

22. A method, comprising:

initiating an operation to characterize a plurality of blocks of a memory system, each block of the plurality of blocks comprising a plurality of planes;

identifying a first quantity of complete blocks of the plurality of blocks and a second quantity of reduced blocks of the plurality of blocks based at least in part on initiating the operation, wherein each plane of each block of the first quantity of complete blocks is available for use to store information associated with a host system, wherein at least one plane of each block of the second quantity of reduced blocks is unavailable for use to store the information associated with the host system;

determining, for a block of the second quantity of reduced blocks, whether a quantity of planes available for use to store the information in the block satisfies a threshold based at least in part on identifying the first quantity of complete blocks and the second quantity of reduced blocks; and assigning the block as a special function block configured to store data associated with a function of the memory system based at least in part on determining that the quantity of planes available for use to store the information in the block of the second quantity of reduced blocks satisfies the threshold.

23. The method of claim 22, further comprising:

determining whether the block includes a plane that is unavailable for use to store the information associated with the host system based at least in part on one or more errors associated with the plane, wherein identifying the second quantity of reduced blocks of the plurality is based at least in part on determining whether the block of the plurality of blocks includes the plane that is unavailable.

24. The method of claim 22, further comprising:

assigning a second block of the second quantity of reduced blocks as a repaired blocks configured to place a bad plane of the second block with a good plane of a different block of the second quantity of reduced blocks based at least in part on identifying the second quantity of reduced blocks; and assigning a third block of the second quantity of reduced blocks as a replacement block configured to use one or more of its good planes as replacement planes for other blocks of the second quantity of reduced blocks.

25. The method of claim 24, further comprising:

replacing the bad plane of the second block with a good plane of the third block; and assigning the second block as a complete block based at least in part on replacing the bad plane of the second block.

* * * * *